Jan. 16, 1962  A. J. WILLIAMS, JR  3,017,561
ELECTRICAL CONVERTER
Filed Nov. 28, 1958

3,017,561
ELECTRICAL CONVERTER
Albert J. Williams, Jr., Philadelphia, Pa., assignor to Leeds and Northrup Company, Philadelphia, Pa., a corporation of Pennsylvania
Filed Nov. 28, 1958, Ser. No. 777,076
9 Claims. (Cl. 321—45)

This invention relates to converters for converting direct current to alternating current and for converting alternating current into direct current and has for an object the provision of a full-wave converter utilizing a two-terminal switch element therein.

Converters, known to those skilled in the art as modulators and demodulators, of the full-wave type have heretofore required at least two two-terminal switching elements whether in the form of a single-pole, double-throw switch, two single-pole, double-throw switches, or two transistors which may be described as two-terminal switching devices. Transistors lend themselves to converter applications by reason of the fact that the speed of operation is limited only by the characteristics of the transistors themselves. Thus, high speeds of operation may be utilized and the conversion from alternating current to direct current and vice versa may be at any desired operating frequency. In order to achieve a substantial saving in cost as by the utilization of a single transistor instead of two and yet to retain the advantages of full-wave operation, there is provided in accordance with the present invention a full-wave converter utilizing but a single transistor.

In carrying out the invention in one form thereof, a two-terminal switching device is included in one arm of a bridge circuit, an external direct current circuit forming one diagonal of the bridge and an external alternating current circuit forming the other diagonal thereof. Impedance elements are included in each of the remaining arms of the bridge which function with the opening and closing of the circuit through the arm including the two-circuit element switching device which produces conversion of direct current to alternating current and vice versa.

Figure 1:
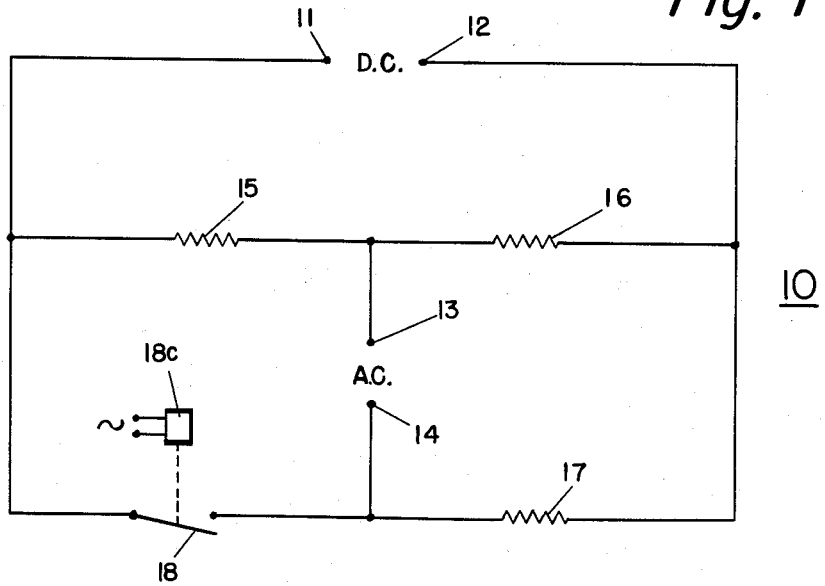

For further objects and advantages of the invention and for a detailed discussion of the selection of circuit values and the like, reference is to be had to the following description taken in conjunction with the accompanying drawings, in which:

FIG. 1 diagrammatically illustrates the simplest form of the invention; and

Figure 2:
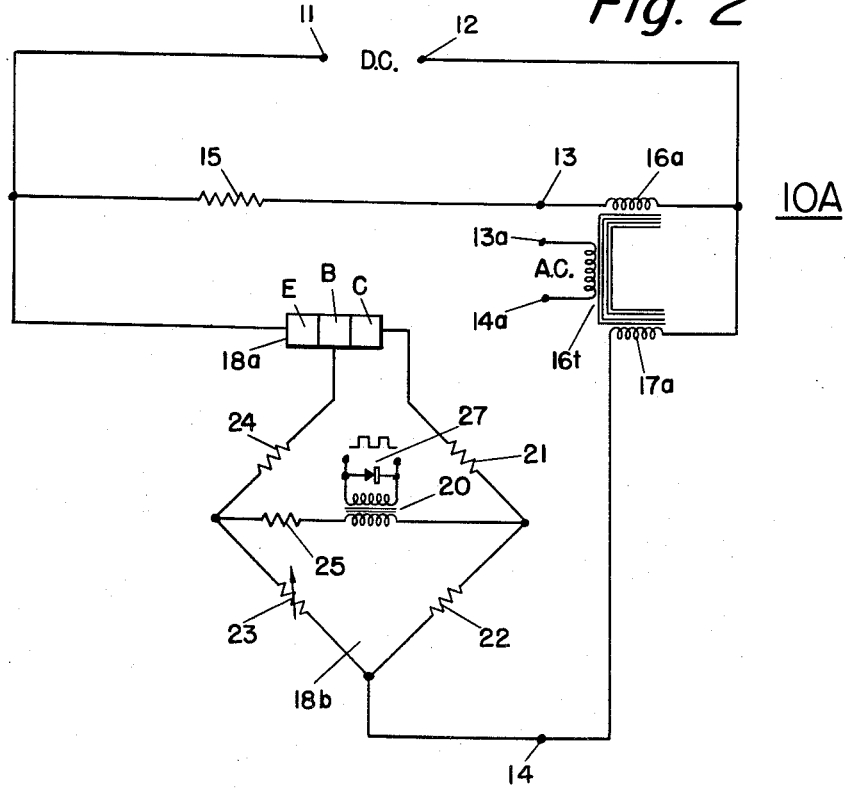

FIG. 2 illustrates the converter utilizing but a single transistor for producing full-wave operation.

Referring to FIG. 1, a bridge circuit 10 has an external direct current circuit represented by the direct current terminals 11 and 12 connected across one diagonal of the bridge. Across the other diagonal of the bridge is connected an external alternating current circuit represented by the terminals 13 and 14. A two-terminal switching device 18 is included in one arm of the bridge and, as shown, comprises a single-pole, single-throw switch operated by a coil 18c in accordance with the frequency of the alternating current supplied to its winding. Though the values of the circuit components in the remaining arms of the bridge are not of critical character, nevertheless in the preferred form of the invention the resistor 17 has a value high relative to the resistance through the switch 18 in the closed position. Resistor 15 has a value materially greater than the sum of the resistances of resistors 16 and 17 in the remaining two arms of the bridge. Resistors 16 and 17 are preferably of equal value. The resistance between the terminals 13 and 14, that is, of the external alternating current circuit, is preferably materially higher than the resistance of resistor 17.

If it now be assumed that a direct current voltage be applied to terminals 11 and 12, with the switch 18 in the open circuit position, it will be seen that the terminal 14 is effectively connected to the terminal 12. Assuming that the terminal 12 is of negative polarity, then the alternating current terminal 14 will be of negative polarity relative to terminal 13.

If it now be assumed that the switch 18 is closed, it will be seen that terminal 11, of positive polarity, will be directly connected to the terminal 14. Summarizing, with the switch open, terminal 14 will be negative. With switch 18 closed, it will be positive relative, in each case, to terminal 13. Thus the conditions characteristic of an alternating current have been met in that the polarity of the voltage between terminals 13 and 14 is first in one direction and then in the opposite direction.

As to the selection of the resistors for the system of FIG. 1, it has already been noted that resistors 16 and 17 are preferably of equal value. If it be desired that upon application of direct current to input terminals 11 and 12 there shall be produced at output terminals 13 and 14 alternating current with half-cycles of approximately equal magnitude, the following relationship may be utilized for determining the relative values of resistors 15 and 16 with reference to the resistance $R_{11-12}$ of the direct current input circuit 11, 12:

$$R_{15} = \sqrt{2R_{11-12}R_{16} + R_{16}^2} \qquad (1)$$

With the above understanding of the invention, it will, of course, be understood that if alternating current be applied to terminals 13 and 14 with the operating coil 18c energized from, or with the same frequency as, that same source of alternating current, the reverse operation will occur: rectified direct current will appear at terminals 11 and 12. That there will be full-wave rectification of the alternating current will be seen by assuming that the switch 18 is in the open position at the time there appears at terminal 14 a positive half-cycle. With switch 18 open and contact 14 positive, then the direct current output terminal 12 will be positive relative to terminal 11. Upon the next half cycle, terminal 14 will be negative relative to terminal 13 and the switch 18 will be in its closed position. At this time, terminal 14 will be directly connected to terminal 11. Thus for the negative half cycle, terminal 11 is again negative relative to terminal 12. Thus for the succession of half-cycles of the alternating current, the external terminal 12 is maintained positive, and terminal 11 negative. In this manner, the conditions for full-wave operation have been met. There is achieved full-wave rectification of the applied alternating current.

The full-wave rectifier is also phase sensitive in that if the phase of the alternating voltage is reversed from that assumed above so that the terminal 14 is negative when switch 18 is open, the terminal 12 will be maintained negative relative to terminal 11 for each half-cycle of the alternating voltage.

With the above understanding of the basic principles upon which the present invention is based, it will be seen that they have been utilized in FIG. 2 where corresponding parts have been given corresponding reference characters. In this connection, it is to be understood that the transistor 18a of FIG. 2, together with the associated control circuit now to be described, may be utilized directly in the system of FIG. 1, that is to say, the connection to the emitter would be in place of the movable contact of switch 18, and the point 14 of FIG. 2 would correspond with the connection to stationary contact of switch 18. The switch 18 of FIG. 1 has been replaced in FIG. 2 by transistor 18a operating under the control of a circuit 18b connected to two control electrodes of the transistor 18a, such for example, as between the base B and collector C thereof.

The external alternating current circuit through contacts 13a, 14a and transformer 16t is effectively connected across points 13 and 14, which identify one diagonal of the bridge 10A of FIG. 2. As in FIG. 1, the external direct current circuit is connected at terminals 11 and 12 across the other diagonal of the bridge 10A. Resistors 16 and 17 of FIG. 1 have been replaced by windings 16a and 17a of a transformer 16t with the magnetically coupled winding associated therewith terminating at terminals 13a and 14a.

If the system of FIG. 2 be utilized as a converter and it be desired that the positive and negative half-cycles of alternating current shall be approximately equal, the following relationship can be utilized in selection of the size of resistor 15 relative to the resistance $R_{11-12}$ of the direct current source at terminals 11 and 12 and the resistance $R_{13a-14a}$ of the alternating current source at terminal 13a and 14a:

$$R_{15} = \sqrt{4R_{11-12} \times R_{13a-14a}} \qquad (2)$$

based on a turns ratio between each of the primary windings 16a, 17a of one-to-one with respect to the secondary winding connected to terminals 13a, 14a.

By means of the control circuit 18b including control transformer 20, the transistor 18a is cyclically turned on and off for conversion of a direct current voltage applied between terminals 11 and 12 to an alternating current voltage at output terminals 13a and 14a.

For operation as a demodulator, alternating current is applied to the external contacts 13a, 14a, and synchronously therewith there is applied to the primary winding of the control transformer 20 an alternating current switching voltage, preferably of the square wave type. The control circuit 18b thereupon turn transistor 18a on and off synchronously with the applied alternating current to produce full-wave phase-sensitive rectification of that current at the external output circuit terminals 11 and 12.

The control circuit 18b is illustrated as a bridge circuit including a temperature compensating resistor 21 in the arm extending from one diagonal to the collector of transistor 18a. It includes a compensating resistor 22 in series with the transistor 18a, the resistor 21, and the circuit extending between terminals 11 and 14. A variable resistor 23 is included in a third arm of the bridge, and a resistor 24 in the remaining arm of the bridge, this resistor being connected directly to the base B of the transistor. Though not necessary, a resistor 25 is illustrated in series with the secondary winding of transformer 20, its purpose being to control the magnitude of the control signal applied to transistor 18a.

Transistors have characteristics which change with temperature and which give rise to voltage offset. In order to compensate for changes in the characteristics of the transistor 18a with temperature, the resistor 21 is preferably selected for a positive temperature coefficient, such as may be provided by a resistor of nickel. Resistor 21 is then effective to overcome the negative temperature coefficient in the transistor 18a.

In order to avoid in either external circuit the effects of voltage offset, the resistor 22 is included in the circuit between terminals 11 and 14 for purposes fully explained in copending application Serial No. 764,585, filed October 1, 1958, by N. E. Polster, a co-employee of mine and which application is assigned to the same assignee as the present application. In said Polster application it is explained that when a control voltage is applied to the secondary windings of transformer 20 of a polarity which turns on the transistor 18a, that voltage concurrently sends through resistor 22 a current which develops a voltage of magnitude and polarity which exactly compensates for, or neutralizes, the voltage offset of transistor 18a and the potential difference developed across resistor 21. The voltage offset of transistor 18a is due to the action of that transistor as a voltage source during the time it is made conductive. Accordingly, by providing resistor 22 for introducing an opposing voltage, the effect of the transistor 18a acting as a voltage source is eliminated insofar as it may affect the output of either of the external circuits. The resistor 23 is variable in order to adjust the magnitude of the potential difference to be developed across resistor 22 for the aforesaid compensation.

In one embodiment of the invention, the transformer 16t had a voltage ratio of one-to-one as between the winding connected to terminals 13a and 14a and each of the other windings 16a and 17a. At 60 cycles per second the transformer had an impedance of the order of 500,000 ohms. The transistor 18a was of the silicon alloy junction type, as for example, the type available from Philco under No. 2N496. The resistor 15 had a value of 23,000 ohms, while the resistors 21, 22, 23 and 24 of the control circuit 18b were respectively 0.8 ohm, 3 ohms, 2600 ohms, and 4700 ohms. The transformer 20 may be conventional with a Zener diode 27 connected across the primary winding to produce a well regulated alternating current voltage of the square wave type across the secondary.

What is claimed is:

1. A full-wave converter comprising a bridge circuit having four arms, a two-terminal switching device in series in one of said arms for alternately interrupting and completing the circuit through said one arm, impedance elements in the remaining arms of said bridge circuit, an external direct current circuit connected across one diagonal of said bridge, an external alternating current circuit connected across the remaining diagonal of said bridge, and means including an alternating current source of supply separate from said alternating current circuit for operating said switching device at a predetermined frequency for producing a direct current output for said direct current circuit of one polarity or of an opposite polarity upon energization of said alternating current circuit with alternating current of one phase or of an opposite phase and upon energization of said direct current circuit with direct current of one polarity or of an opposite polarity for producing at said alternating current circuit an alternating current output of one phase or of an opposite phase.

2. The converter of claim 1 in which said two-terminal switch comprises transistor means having control electrodes, and a control circuit associated with said control electrodes for turning said transistor means on and off at said predetermined frequency.

3. The converter of claim 2 in which said transistor means comprises a single transistor.

4. The converter of claim 1 in which said bridge includes a pair of transformer windings forming the impedance elements of two arms of the bridge, and a third winding magnetically coupled thereto connected to the terminals of the external alternating current circuit.

5. The converter of claim 2 in which said bridge includes a pair of transformer windings forming the impedance elements of two arms of the bridge, and a third winding magnetically coupled thereto connected to the terminals of the external alternating current circuit.

6. The converter of claim 2 in which said bridge includes a pair of transformer windings forming the impedance elements of two arms of the bridge, a resistor forming the third arm thereof, and said transistor means forming the fourth arm thereof, a third winding of said transformer being magnetically coupled to said pair of transformer windings and connected to the terminals of said external alternating current circuit, said resistor having a value approximately equal to the square root of four times the product of the resistances of said external circuits based on a turns ratio of one-to-one between each of said pair of windings and said third winding.

7. The converter of claim 2 in which said bridge includes three resistors forming three arms of the bridge and said transistor means forming the fourth arm of the bridge, and in which said resistor having a connection common with said transistor means and one side of said external direct current circuit has the value approximately equal to the square root of the sum of the square of the resistance of one of the resistors in the remaining two arms of the bridge and twice the produce of the resistance of the external direct current circuit and the resistance of said last-named resistor where said two resistors in said remaining arms have resistance values equal to each other.

8. The converter of claim 3 in which said control circuit includes circuit components at least one of which is in series-circuit relation with said transistor, and means for energizing said last-named circuit component for developing in series with said transistor a voltage of magnitude at least equal and opposite to the action of said transistor as a voltage source during the time it is conductive.

9. A full-wave converter comprising a bridge circuit having four arms, an external direct current circuit connected across one diagonal of said bridge, an external alternating current circuit connected across the remaining diagonal of said bridge, impedance elements in at least three arms of said bridge circuit, means including at least a two-terminal switching device connected across the remaining arm of said bridge for alternately interrupting and completing a circuit for said remaining arm of said bridge, and means including an alternating current source of supply separate from said alternating current circuit for operating said switching device at a predetermined frequency for producing a direct current output for said direct current circuit alternately to unbalance said bridge first in one direction and then in the other direction for producing a direct current output for said direct current circuit of one polarity or of an opposite polarity upon energization of said alternating current circuit with alternating current of one phase or of an opposite phase and upon energization of said direct current circuit with direct current of one polarity or of an opposite polarity for producing at said alternating current circuit an alternating current output of one phase or of an opposite phase.

References Cited in the file of this patent
UNITED STATES PATENTS

| | | |
|---|---|---|
| 2,209,138 | Rosenberger | July 23, 1940 |
| 2,683,853 | Logan | July 13, 1954 |
| 2,860,300 | Sampietro | Nov. 11, 1958 |
| 2,912,638 | McNamee | Nov. 10, 1959 |
| 2,926,296 | Pinckaers | Feb. 23, 1960 |